INVENTORS
DONALD L. LYNCH,
ALEX. K. ZWEEDE
BY Woodling, Krost,
Granger and Rust
ATTORNEYS March 5, 1968     D. L. LYNCH ETAL     3,372,292
LIQUID-COOLED EDDY CURRENT DEVICE
Filed Oct. 27, 1964     2 Sheets-Sheet 2
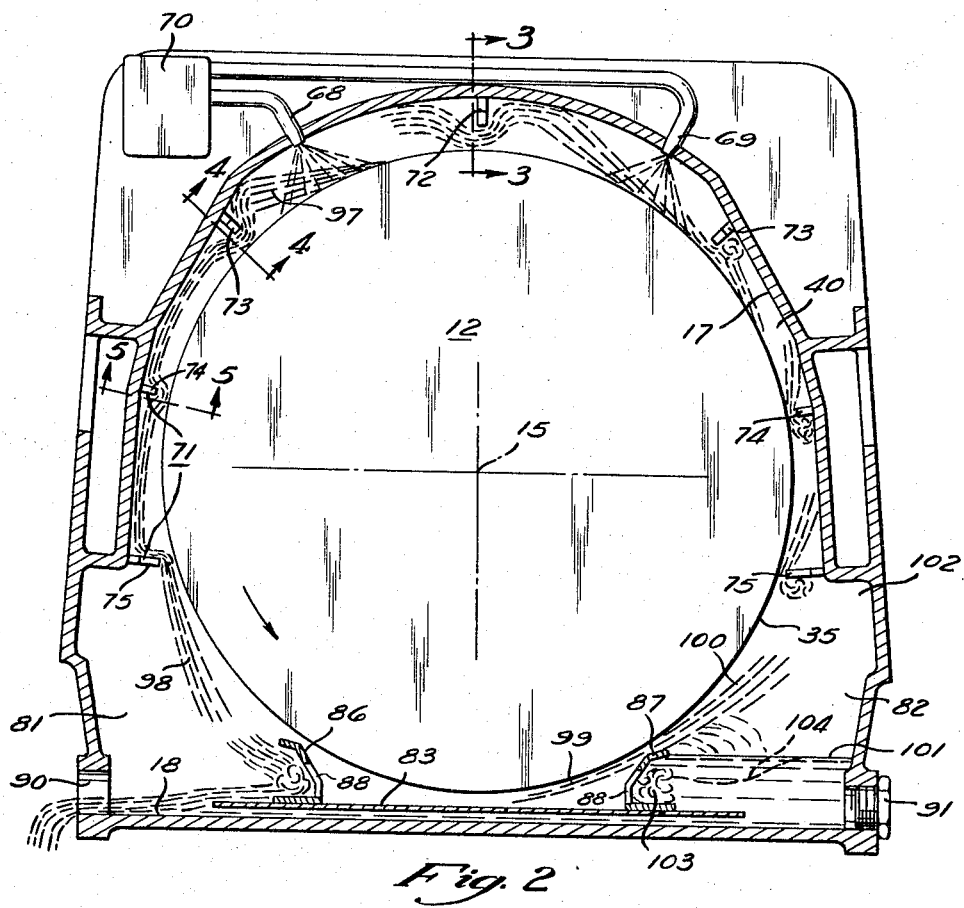
INVENTORS
DONALD L. LYNCH,
& ALEX. K. ZWEEDE
BY Woodling, Krost
Granger and Rust
ATTORNEYS United States Patent Office 3,372,292
Patented Mar. 5, 1968

3,372,292
LIQUID-COOLED EDDY CURRENT DEVICE
Donald L. Lynch, Chagrin Falls, and Alexander K. Zweede, Euclid, Ohio, assignors to The Reliance Electric and Engineering Company, a corporation of Ohio
Filed Oct. 27, 1964, Ser. No. 406,790
16 Claims. (Cl. 310—105)

ABSTRACT OF THE DISCLOSURE

The disclosure shows an eddy current device, a clutch or brake, which is water-cooled by water spraying on the exterior passive surface of the eddy current drum. Centrifugal force of the rotating drum throws the water off and circumferential air flow caused by the rotating drum causes this water to travel circumferentially around the housing inner surface. Baffles are mounted on this housing inner surface to redirect the water several times onto the drum exterior surface to extract more heat from the drum to increase the power rating. A false bottom raised above the floor of the housing permits water to run underneath this false bottom to a drain in a lower corner of the housing.

---

The invention relates in general to eddy current devices such as clutches and brakes and, more particularly, to liquid-cooled devices such as water-cooled devices with improved cooling for greater capacity of the machine.

Water-cooled eddy current clutches and brakes have been heretofore used. One type of eddy current machine has a rotatable eddy current member such as a drum with an active surface and a passive surface. The active surface is that with which teeth of the eddy current device coact magnetically through an active air gap to develop the clutching or braking torque of the machine. Attempts have been made to cool the machine with water in this active air gap, but water corrosion problems and water slugging problems caused by slugs of water between the drum and the teeth have severely limited the practicality of this type of machine.

Other types of machines have water cooled the exterior or passive surface of the eddy current member or drum. One such type has included one spray nozzle for water sprayed generally at the top of the drum outer surface to extract heat from this drum. However, two problems have resulted, one being that the centrifugal force of the rotating drum throws water off this drum outer surface so that only a limited amount of heat is extracted. Another problem is that the water must drain from the machine and if it does not drain away rapidly enough, water can rise high enough in the housing to touch the outer surface of the drum at the bottom. This will cause an extra drag on this drum which is a power loss if the device is used as a clutch. Additionally, the water, if it does not drain away rapidly enough, can rise high enough to have a slug of water carried between the surface of the drum and the housing of the machine completely around the drum. This will provide a sudden and uncontrolled drag on the drum. Also, the water level can sometimes rise so high that water goes through the labyrinth or water seal to get into the active air gap between the magnetic teeth and the active drum surface. This may be termed flooding and can also cause a slug of water to be carried around between the drum and the magnetic teeth in the active air gap and this will also cause a sudden and uncontrolled extra drag on the eddy current clutch or brake.

The maximum power capabilities of the eddy current clutch or brake are limited by the amount of heat which may be extracted from the machine because all of the eddy current slip losses, whether as a clutch or brake must, of necessity, be transformed into heat. To increase the capacity of the machine for a given physical size it is therefore necessary to extract more heat and this is why water cooled machines are often used rather than air cooled, especially in the larger sizes. The increased heat losses for increased horsepower capacities, however, mean an increased water flow and this increased water flow has resulted in the aforementioned deficiencies of flooding of the machine or slugs of water being carried around by the rotation of various parts of the machine to result in the uncontrollable drag torques.

An object of the present invention, accordingly, is to preclude the above-mentioned extra and uncontrolled drag torques on the eddy current machine while maintaining the same rated power output of the machine or even increasing the same.

Another object of the invention is to provide a maximum increase of horsepower capacity for a given physical size.

Another object of the invention is to provide a water cooled eddy current machine with improved means of wetting the eddy current member or drum.

Another object of the invention is to provide both active and passive means for liquid cooling the eddy current drum.

Another object of the invention is to provide superior water drain means from the machine to prevent flooding or slugging.

Still another object of the invention is to provide means to effectively apply water to more than 180 degrees of the periphery of the eddy current drum.

Another object of the invention is to provide means to separate the drain water flow from the water movement caused by drum rotation and consequent circumferential air flow.

A feature of the invention is to provide a plurality of water spray nozzles to actively spray water on the eddy current drum surface and a plurality of passive means in the form of baffles on the interior of the housing wall to redirect water onto the drum surface to extract additional heat from the eddy current drum. A false bottom may be provided in the machine in the water cooling compartment or water box to separate drain water flow beneath this false bottom from the circumferential movement of water as caused by drum rotation which may be in the opposite direction from the drain water flow. This false bottom may include deflector scoop means to decelerate the water flow as caused by drum rotation to aid in preventing flooding and slugging.

Other objects and a fuller understanding of the invention may be had by referring to the following description and claims, taken in conjunction with the accompanying drawings, in which:

FIGURE 2 is a simplified cross-sectional view of the machine of FIGURE 1, showing the water flow; and, FIGURES 3, 4 and 5 are sectional views on the correspondingly numbered sectional lines of FIGURE 2.

Figure 1:
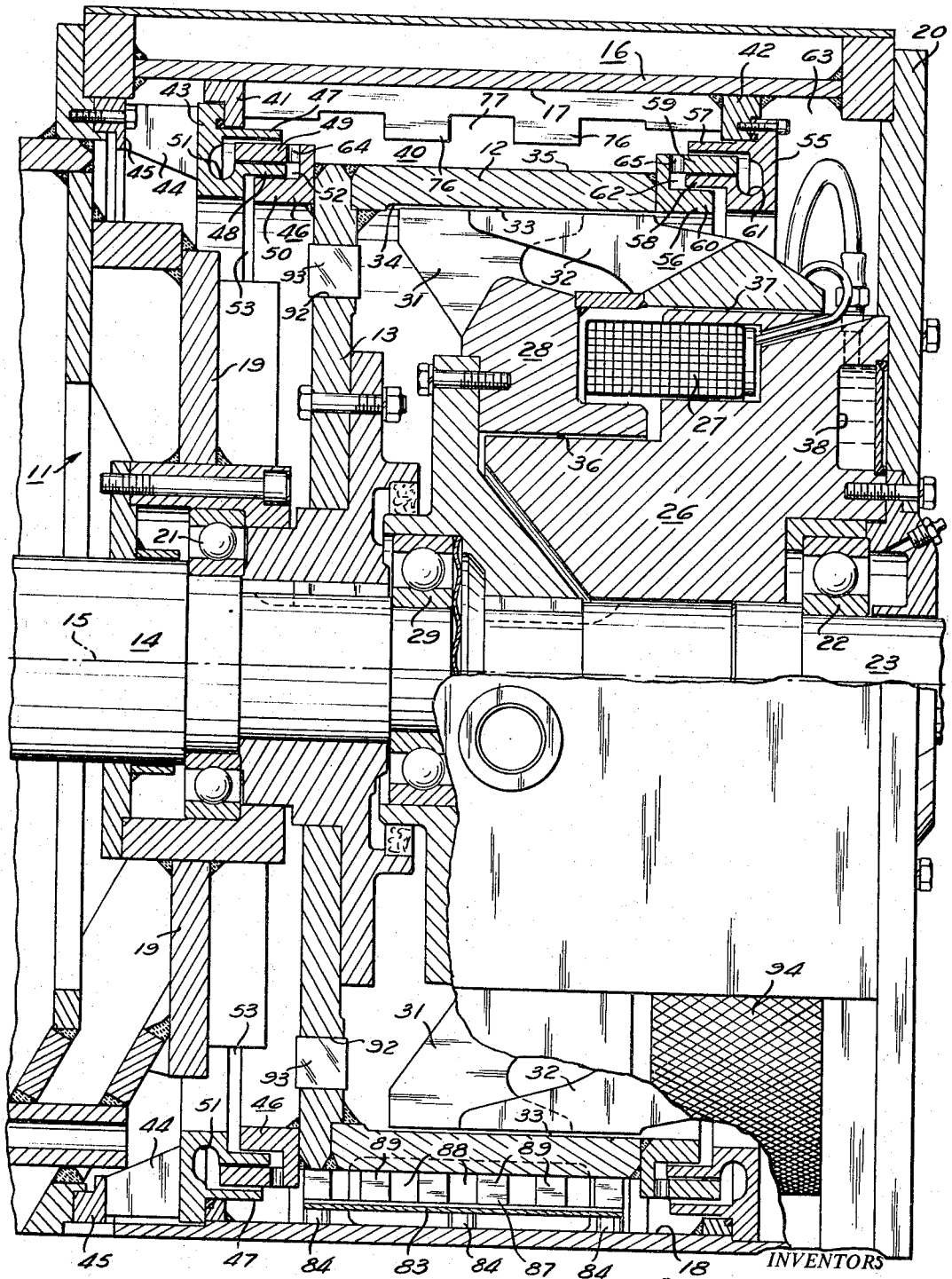
FIGURE 1 is a longitudinal sectional view, partly in elevation, showing an eddy current clutch embodying the invention.

FIGURES 1 and 2 illustrate one form of the invention as applied to an eddy current machine 11, in this case illustrated as an eddy current clutch. This invention may be applied to any machine having a rotating member from which heat is to be extracted. In this case, the eddy current member 12 is a drum which is mounted on an apertured support 13 on a first shaft 14. This shaft has an axis 15 and is journalled in the machine housing 16. This housing has a peripheral inner wall 17, a bottom wall 18 and first and second end bells or brackets 19 and 20, respectively. A bearing 21 carried in the end bell 19 journals the first shaft 14 and a second bearing 22 in the second end bell 20 journals a second shaft 23. These shafts are the input and output and, advantageously, the first shaft 14 may be the input, for example, from a motor or other substantially constant speed driving source, not shown.

The second end bell 20 carries a first core 26 which, in turn, carries a stationary annular coil 27. A magnetic rotor 28 is fixed to rotate with the shaft 23 and a bearing 29 acts between the rotor 28 and the first shaft 14 to align the first and second shafts. The rotor 28 has first and second sets 31 and 32, respectively, of interdigitated teeth which cooperate through an active air gap 33 with the inner surface 34 of the eddy current member or drum 12. The drum 12 has an outer cylindrical surface 35 which is preferably smooth. The core 26 cooperates with the rotor 28 through passive air gaps 36 and 37 to provide a substantially closed magnetic circuit surrounding the coil 27 which magnetic circuit extends through one set of teeth 31 into the drum 12 and back into the other set of magnetic teeth 32. Thus, the magnetic circuit establishes magnetic cooperation between the rotor teeth 31 and 32 and the drum 12 in order to provide a coupling or slip clutch between these two in accordance with the excitation of the coil 27. A water-cooled annulus 38 may be provided in the core 26 to cool the coil 27.

The housing 16 includes an annular water box 40. This water box is defined in part by the drum outer surface 35, the housing inner wall 17 and the bottom wall 18. Also, radially short first and second annular walls 41 and 42 are provided in the housing 16. A rotating water seal is provided between the drum 12 and the housing 16 at these annular walls 41 and 42. This water seal is provided by labyrinth means which are provided at each axial end of the drum 12. A non-magnetic ring 43 is held by spokes 44 and a ring 45 from the end bell 19. This non-magnetic ring 43 cooperates with a labyrinth ring 46 fixed on one axial end of the drum 12. This may also be non-magnetic although where the ring 43 is provided as being non-magnetic, it is usually not necessary to also provide ring 46 as being non-magnetic. The ring 43 has two axially projecting portions 47 and 48 and similarly, the ring 46 has complementary axially projecting portions 49 and 50 which interleave with the portions 47 and 48. This provides a tortuous passageway or labyrinth leading from the water box 40 into a gutter 51 and then into a cavity 52 between axial portions 49 and 50 and, finally into a volume 53 radially inwardly of the ring 46 and spaced between the end bell 19 and drum support 13.

At the other axial end of the drum 12 a non-magnetic ring 55 and labyrinth ring 56 provide a similar function. The non-magnetic ring 55 is fixed to the second annular wall 42 and has axially projecting portions 57 and 58 interleaved with axially projecting portions 59 and 60 on the ring 56. Also, the ring 55 has a gutter 61 to form a water flow channel to the bottom of the housing 16. A cavity 62 is provided between the portions 59 and 60 and a volume 63 is provided between the end bell 20 and the rotor teeth 32 and radially inwardly from the rings 55 and 56.

A plurality of radially directed holes 64 are provided in the axial portion 49 leading outwardly from the cavity 52. Similar holes 65 are provided in the axial portion 59 of the ring 56 leading outwardly from the cavity 52.

The FIGURE 2 especially shows first and second water spray nozzles 68 and 69 mounted through the wall of the housing 16 and positioned to spray water on the outer drum surface 35. These nozzles are connected by conduits to a water control system 70 which may be used to control the flow of water in accordance with temperature of the eddy current machine 11, in order to properly cool this machine. This may be a continuous flow or a modulated flow or a combination of both in order to provide the proper amount of water flow through the nozzles 68 and 69. These nozzles 68 and 69 direct water on the upper portion of the drum 12 and as shown, are positioned at an acute angle of about 30 degrees on each side of the longitudinal centerline of the machine 11.

A plurality of baffle means 71 are provided on the housing inner wall 17. These baffle means extend generally longitudinally and, as shown, there are seven baffles forming these baffle means. FIGURES 3, 4 and 5 show in longitudinal views, the various baffles 72, 73 and 74 which make up the baffle means 71. The baffle 72 is positioned at the top dead center of the machine and there are two baffles 73 equally positioned on either side of the longitudinal center line. Next, there are two baffles 74 positioned on either side of the longitudinal center line, and finally, there are baffles 75 positioned near the lower edge of the housing inner wall 17 and below the horizontal plane extending through the axis 15. Each of these baffles 72 to 75 may be constructed from sheet metal for simplicity and low cost and may be mounted by a right angle flange bent over to engage the inner wall 17.

Each baffle 72–75 has a plurality of teeth 76 and a plurality of gaps 77 between the teeth. The teeth on adjacent baffles are staggered, for example, the teeth 76 on the baffle 72 are in the same cross-sectional plane as the gaps 77 between the teeth in the adjacent baffles 73.

The housing inner wall 17 is generally rectangular at the lower portion thereof so that the annular water box 40 has first and second enlarged lower corners 81 and 82, respectively. A false bottom 83 is provided in the annular water box 40. This false bottom comprises a substantially flat plate which is mounted on pedestals 84 upstanding from the bottom wall 18 of the housing. This false bottom plate is mounted to be substantially parallel to this bottom wall 18. The false bottom 83 has a longitudinal length approximately the same as the drum 12 and has a transverse width about 80% of the width of the housing bottom wall 18.

Deflector scoop means are provided as a part of the false bottom 83 and these include first and second scoops 86 and 87. Each deflector scoop has a flange mounting on the false bottom 83 and extends upwardly toward the outer surface 35 of the drum 12. The scoops 86 and 87 are symmetrically placed, one on each side of the longitudinal center line of the machine, and are at a position about 30 degrees from the vertical axial plane as measured at the axis 15. Each deflector scoop is apertured and this is shown as being slots 88 extending from the flange mounting upwardly about half the height of each scoop. The top portion of each scoop is preferably closed with no apertures therein and this top portion extends generally close to the drum outer surface 35. The apertures or slots 88 in each scoop form what may be considered teeth 89 between each slot in each of the scoops. The first corner 81 is shown as having a drain opening 90 and a plug 91 is shown in a similar opening in the second corner 82.

The machine 11 is essentially a water-cooled machine but a certain amount of air circulation may beneficially be provided. The drum support 13 has apertures 92 therein and small fan blades 93 may be mounted in these apertures. These fan blades extend at an angle to the axis 15 so that upon either direction of rotation of the drum 12 there will be an air circulating action caused by the blades 93 in one axial direction or the other. Air ventilating screened openings may be provided in the lower portion of the housing at each axial end of the housing. One such opening 94 is shown in FIGURE 1 and a similar one is provided at the other axial end. For rotation of the drum in a first rotational direction, this may draw air as caused by the fan blades 93 through the forward ventilating opening 94 into the volume 63, through the spaces between the sets of teeth 31 and 32 and through the fan blade apertures 92 into the volume 53, from whence it exists out the other ventilating opening at the rear of the machine 11. With rotation of the drum in the other direction, this will provide a small amount of axial air flow in the opposite axial direction. This purges the interior of the machine housing 16 to keep the humidity low around the bearings and around the coil 27 and prevents any condensation of moisture which might have a harmful effect.

OPERATION

The machine 11 is a liquid-cooled machine which has been described as being cooled by water. This machine has a high thermal capacity for its physical size, namely, it is capable of extracting a large amount of heat from the eddy current drum 12 which is where the principal heat is generated and, thus, the heat which is generated by the slip of the eddy current coupling, whether as a clutch or a brake, may readily be dissipated so that the machine may properly perform its function. The water control system would normally be turned on at the time that the eddy current machine 11 was placed in use and the amount of water entering through the nozzles 68 and 69 is generally dependent upon the rate of heat generated within the machine and which must be extracted from the machine.

FIGURE 2 best diagrammatically illustrates the water flow and the drum 12 may rotate in either direction. It is shown as rotating counterclockwise. As the water sprays in from the nozzles 68 and 69, it impinges on the outer drum surface 35 and a majority of it is immediately thrown off circumferentially as shown at 97. The drum 12 is frequently driven at a substantially constant speed from a motor, for example, and thus the water 97 is thrown off at a high rate of speed to strike the housing inner wall 17 and have a circumferential water flow around this inner wall. The baffle means 71 interrupt this circumferential flow of water and redirect the water onto the outer surface 35 of the drum 12. The fact that the drum is rotating at a high speed and the fact that the water is thrown off circumferentially, builds up a high velocity of circumferential air flow around the drum in the water box 40 as caused by drum rotation. This high velocity and high volume of circumferential air flow will cause the water to flow circumferentially around the housing inner wall, even on the upper portion thereof, despite gravity. However, the baffles 72-75, and especially the teeth thereof, form passive means to interrupt this circumferential water flow and to redirect it onto the drum outer surface 35. The nozzles 68 and 69 are active means to initially direct water onto the drum surface and to initially extract heat from this drum surface. The baffles 72-75, being passive means, redirect this water flow onto the drum to provide an arc of greater than 180 degrees of the drum surface which is being wetted by the water. This provides a very large surface of the drum which is actively giving up heat to the water and, hence, this materially increases the rate of heat removal from the drum 12, in comparison to the prior art construction which typically had a single nozzle at the top center of the machine without any baffle means or passive means to redirect the water onto the drum outer surface. Accordingly, the same amount of water flow is much more effective in extracting heat from the machine and, accordingly, the horsepower capabilities of the machine for a given size are, accordingly, materially increased.

The aforementioned circumferential water flow and primarily the circumferential air flow is permitted by the gaps 77 between the teeth 76 in the baffles 72-75. Also, the fact that the teeth 76 are staggered on adjacent baffles helps to break up the circumferential air flow so that it tries to follow a devious or tortuous path, helps assure that the circumferential air flow does not carry droplets of water which are not actively being redirected onto the drum surface. This assures the maximum amount of water being passively redirected onto the drum outer surface 35. If full depth baffles were used which would extend close to the outer drum surface 35, this would establish air circulation within the space between two baffles. Such air flow could accumulate enough water between two baffles to eventually flood the space between the two baffles. The gaps 77 between the teeth 76 prevent this occurrence.

The false bottom 83 is a wall means to permit placid water flow therebeneath to a drain 90 in the first corner 81. This false bottom permits satisfactory drain of water from the machine 11 through the drain 90 regardless of rotational direction of the drum 12 and regardless of whether the drain opening is at the upstream or downstream corner with respect to drum rotation. FIGURE 2 illustrates counterclockwise drum rotation and with the drain opening 90 at the upstream corner, which is the poorer of the two conditions of operation. It is better if the drum rotation throws water to a downstream corner whereat the drain opening is located. However, the direction of drum rotation and the selection of drain opening on one side or the other is left to the customer and may depend upon the machine components with which the eddy current machine is used and availability of space on each side of the machine. It may not be convenient or possible to provide a drain opening on one particular side and yet the machine may operate in the wrong rotational direction, that is, it may throw water to the downstream corner which has no drain opening. Also, the eddy current machine 11 may be used in a reversing drive application and with only one drain opening used, this would naturally provide a condition of one rotational direction throwing water to a downstream corner whereat there was no drain opening. This is the condition illustrated in FIGURE 2. Under conditions of high water volume entering through the nozzles 68 and 69, which is the condition at maximum rating of the machine 11, the worst conditions are encountered, and the prior art machines have often failed at or near this maximum rating wherein flooding or slugging of the machine has occured. It has been found that this false bottom 83 and deflector scoops 86 and 87 materially reduce or eliminate this flooding or slugging and, hence, increase the rated capacity of the machine for a given size.

Water 98 is indicated as being thrown off the drum outer surface 35 in the lower left quadrant. Still more water is thrown off at 99 above the false bottom 83 and still more water is thrown off at 100 into the downstream or second corner 82. The water that is thrown off at 98 into the upstream corner 81 will readily drain out through the drain opening 90. However, the circumferential water flow and primarily the circumferential air flow will build up the water in the downstream corner 82 until it reaches a water level 101, as shown in FIGURE 2. This will provide a sufficiently high head of water to cause sufficient water flow to the left underneath the false bottom so that this water level 101 does not build up any higher. Also, this provides a secondary or bypass drain passage underneath the false bottom 83 so that the water has a relatively placid flow to the drain opening 90. As noted in FIGURE 2, there is sufficient opening at each side of the false bottom 83 to permit the water to flow down below this false bottom. Also as will be noted in FIGURE 1, the longitudinal length of the false bottom 83 is approximately the same as the drum 12 so that any water such as water 99 thrown off the drum which falls on top of the false bottom, can run off the longitudinal ends of this false bottom plate 83.

The apertures of slots 88 in the deflector scoops 86 and 87 permit air flow through these deflector scoops. However, the teeth 89 between these slots help to break up the circumferential water flow in the direction of drum rotation and to decelerate this water flow. This has the advantage of preventing a large volume of water being thrown up into the upper portion 102 of the down stream corner 82. If the water were permitted to be thrown up into this upper portion 102, the circumferential air flow could gradually build up the water level in this entire corner 82 until this corner was completely filled. Then slugging might occur with a slug of water being carried around between the drum outer surface 35 and the housing inner wall 17. This would provide a sudden and uncontrolled drag torque on the drum 12 which would be very undesirable since it would cause a sudden surge on the machine 11.

The slots or apertures 88 in the deflector scoop 87, which is positioned at the downstream corner 82 for this counterclockwise drum rotation, permits air to pass therethrough and this will cause some turbulence 103 in the water dammed behind the deflector scoop 87. However, this helps to keep the water level from building up on top of the false bottom 83.

If the drum rotation is in the opposite direction, the conditions are improved since the water thrown into the downstream corner 81 will then more readily drain away out of the drain opening 90. Water will still build up in the upstream corner 82 but has been found to usually be depressed as shown by the dotted line 104, because of the circumferential water and air flow similar to, but of opposite hand, the water flow 98.

It has been found that with either direction of drum rotation, the false bottom 83 provides a bypass passageway to permit relatively placid water flow from the corner without a drain port to the corner which does have a drain opening, despite the fact that the circumferential water and air flow above the false bottom may be in the opposite direction. Without this false bottom, the water builds up in the downstream corner until either flooding or slugging occurs. The flooding can occur when the water builds up to such a high level in the bottom of the housing that this water leaks through the water seal means or labyrinth means into the interior of the drum and into the active air gap 33. Slugging will often occur at even lower water levels and occurs when a slug of water is carried around the exterior of the drum 12 between the drum outer surface 35 and the housing inner wall 17. Either of these two conditions will limit the maximum torque capabilities or horsepower capabilities the eddy current machine because these provide uncontrolled braking torques on the drum 12 or the rotor 28. Accordingly, the present invention permits two spray nozzles to be used to apply more water on the drum surface than formerly and also utilizes the baffle means 71 to redirect the water onto the drum surface to permit an even greater horsepower rating of the machine. The false bottom 83 within the water box 40 does not increase the vertical height of the machine since the radial dimension of the water box has not been increased, yet it permits an effective drain of this increased flow of water from the machine to greatly reduce or eliminate flooding and slugging to, thus, still further increase the horsepower rating of the machine for a given size.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An eddy current device comprising, in combination, a housing having an axis and an inner wall,
   an eddy current drum coaxially in said housing and having an outer surface,
   an annular water box including said outer drum surface and said housing inner wall,
   active means including nozzle means directing water spray on the outer drum surface and being thrown off by centrifugal force onto said housing inner wall,
   passive means to redirect said water inwardly onto said drum outer surface including a plurality of baffles mounted on the upper portion of said housing inner wall,
   said baffles having longitudinal teeth with gaps therebetween,
   and the gap between the teeth of the baffles permitting air flow circumferentially around said drum.

2. An eddy current device comprising, in combination, a housing having an axis and an inner wall,
   an eddy current drum coaxially in said housing and having an outer surface,
   an annular water box including said outer drum surface and said housing inner wall,
   active means including nozzle means directing water spray on the outer drum surface,
   a plurality of baffles mounted on the upper portion of said housing inner wall and directed inwardly,
   said baffles having longitudinal teeth with gaps therebetween and the teeth in certain baffles being staggered so that the teeth in one baffle are in the same cross-sectional plane as the gap between the teeth of other of said baffles,
   the gap between the teeth of the baffles permitting air flow circumferentially around said drum,
   the water sprayed on said drum outer surface being thrown off by centrifugal force to flow circumferentially around said housing inner wall,
   and said baffles interrupting said circumferential water flow and constituting passive means to redirect said water radially inwardly onto said drum outer surface.

3. An eddy current device comprising, in combination, a housing having an axis and an inner wall,
   an eddy current drum coaxially in said housing and having an outer surface,
   first and second annular walls in said housing longitudinally spaced,
   first and second annular labyrinth means at each axial end of said drum and cooperating with said first and second annular walls, respectively,
   an annular water box defined by said first and second annular walls and said first and second labyrinth means together with said outer drum surface and said housing inner wall,
   active means including nozzle means directing water spray on the outer drum surface,
   a plurality of longitudinal baffles mounted generally radially inwardly on the upper portion of said housing inner wall,
   said baffles having longitudinal teeth with gaps therebetween and the teeth in certain baffles being staggered so that the teeth in one baffle are in the same cross-sectional plane as the gap between the teeth of other of said baffles.
   the gap between the teeth of the baffles permitting air flow circumferentially around said drum,
   the water sprayed on said drum outer surface extracting heat therefrom and then being thrown off by centrifugal force to flow circumferentially around said housing inner wall,
   said baffles interrupting said circumferential water flow and constituting passive means to redirect said water radially inwardly onto said drum outer surface to extract still more heat from said drum.

4. An eddy current device comprising, in combination, a rigid housing having an axis and an inner wall,
   an eddy current drum coaxially in said housing,
   a rotary member having teeth cooperating through an air gap with an inner surface of said drum,
   a smooth outer cylindrical surface on said drum,
   first and second annular walls in said housing longitudinally spaced,
   first and second annular labyrinth means at each axial end of said drum and cooperating with said first and second annular walls, respectively,
   an annular water box defined by said first and second annular walls and said first and second labyrinth means together with said outer drum surface and said housing inner wall, a plurality of water spray nozzles extending through said housing into the upper portion of said water box and directing water on the outer drum surface, a plurality of baffles mounted generally radially inwardly on the upper portion of said housing inner wall, said baffles extending longitudinally and having longitudinal teeth with gaps therebetween and the teeth in adjacent baffles being staggered so that the teeth in one baffle are in the same cross-sectional plane as the gap between the teeth of the adjacent baffles, the gap between the teeth of the baffles permitting air flow circumferentially around said drum, the water sprayed on said drum outer surface extracting heat therefrom and then being thrown off by centrifugal force to flow circumferentially around said housing inner wall, and said baffles and especially the teeth thereof interrupting said circumferential water flow and constituting passive means to redirect said water radially inwardly onto said drum outer surface to extract still more heat from said drum.

5. An eddy current device comprising, in combination,
a rigid housing having an axis and an inner wall,
an eddy current drum coaxially in said housing,
a smooth outer cylindrical surface on said drum,
first and second end bells in said housing,
first and second annular walls in said housing longitudinally spaced and longitudinally spaced inwardly from the respective end bells,
first and second annular labyrinth means at each axial end of said drum and cooperating with said first and second annular walls, respectively,
an annular water box defined by said first and second annular walls and said first and second labyrinth means together with said outer drum surface and said housing inner wall,
first and second water spray nozzles extending through said housing into said water box and equally disposed at an acute angle on each side of the longitudinal center line of said housing and directing a spray of water on the outer drum surface,
a plurality of baffles mounted extending generally radially inwardly on the upper portion of said housing inner wall,
said baffles extending longitudinally and having longitudinal teeth with gaps therebetween and the teeth in adjacent baffles being staggered so that the teeth in one baffle are in the same cross-sectional plane as the gap between the teeth of the adjacent baffles,
the gap between the teeth of the baffles permitting air flow circumferentially around said drum,
the water sprayed on said drum outer surface extracting heat therefrom and then being thrown off by centrifugal force to flow circumferentially around said housing inner wall,
and said baffles and especially the teeth thereof interrupting said circumferential flow to redirect said water radially inwardly onto said drum outer surface to extract still more heat from said drum.

6. An eddy current clutch comprising, in combination,
a rigid housing having an axis and an inner wall,
an eddy current drum coaxially in said housing,
coaxial input and output shafts in said housing,
a transverse support on one of said shafts for said drum,
a coaxial fixed core in said housing radially spaced from said shafts,
a stationary coil cooperating with said fixed core,
a rotor on the other of said shafts and having interdigitated teeth and establishing a closed magnetic circuit with said fixed core and drum around said coil substantially enclosing same,
said teeth magnetically cooperating with an inner cylindrical surface on said drum,
a smooth outer cylindrical surface on said drum,
first and second annular walls in said housing longitudinally spaced,
first and second annular labyrinth means at each axial end of said drum and cooperating with said first and second annular walls, respectively,
an annular water box defined by said first and second annular walls and said first and second labyrinth means together with said outer drum surface and said housing inner wall,
first and second water spray nozzles extending through said housing into said water box and equally disposed at an acute angle on each side of the longitudinal center line of said housing and directing a spray of water on the outer drum surface,
a plurality of toothed baffles longitudinally mounted generally radially inwardly on said housing inner wall,
the teeth in said baffles being staggered so that the teeth in one baffle are in the same cross-sectional plane as the gap between the teeth of the adjacent baffles,
the gap between the teeth of the baffles permitting air flow circumferentially around said drum,
the water sprayed on said drum outer surface extracting heat therefrom and then being thrown off by centrifugal force to flow circumferentially around said housing inner wall,
and said baffles and especially the teeth thereof interrupting said circumferential flow to redirect said water radially inwardly onto said drum outer surface to extract still more heat from said drum.

7. An eddy current clutch comprising, in combination,
a rigid housing having an axis and an inner wall,
an eddy current drum coaxially in said housing and rotatable at a substantially constant speed,
an apertured transverse support for said drum,
a coaxial output shaft in said housing,
a coaxial fixed core in said housing radially spaced from said output shaft,
a stationary coil cooperating with said fixed core,
an output rotor on said output shaft and having interdigitated teeth and establishing a closed magnetic circuit with said fixed core and drum around said coil substantially enclosing same,
said teeth magnetically cooperating with an inner cylindrical surface on said drum,
a smooth outer cylindrical surface on said drum,
first and second end bells in said housing,
first and second annular walls in said housing longitudinally spaced and longitudinally spaced inwardly from the respective end bells,
first and second annular labyrinth means at each axial end of said drum and cooperating with said first and second annular walls, respectively,
an annular water box defined by said first and second annular walls and said first and second labyrinth means together with said outer drum surface and said housing inner wall,
first and second water spray nozzles extending through said housing into said water box and equally disposed at an angle of about 30 degrees on each side of the longitudinal center line of said housing,
said spray nozzles directing a spray of water on the outer drum surface at two locations near the top of said housing,
seven toothed baffles longitudinally mounted generally radially inwardly on said housing inner wall,
the teeth in said baffles being staggered so that the teeth in one baffle are in the same cross-sectional plane as the gap between the teeth of the adjacent baffles,
the gap between the teeth of the baffles permitting air flow circumferentially around said drum in said water box,
the water sprayed on said drum outer surface extracting heat therefrom and then being thrown off by centrifugal force to flow circumferentially around said housing inner wall, and said baffles and especially the teeth thereof interrupting said circumferential flow to redirect said water radially inwardly onto said drum outer surface to extract still more heat from said drum.

8. An eddy current device comprising, in combination, a housing having an axis and an inner wall and a bottom wall, an eddy current drum coaxially in said housing and having an outer surface, an annular water box including said outer drum surface together with said housing inner wall and bottom wall, means directing water on the outer drum surface, the water on said drum outer surface being thrown off by centrifugal force to flow circumferentially around said housing inner wall in said water box, said housing inner wall and bottom wall defining first and second lower corners in said annular water box, a water drain from said first corner, deflector means fixedly carried relative to said bottom wall and extending upwardly toward said drum outer surface, said deflector means having apertures therein to permit decelerated water flow therethrough in the direction of drum rotation as caused by the drum rotation and circumferential air flow, and wall means in said water box spaced from said bottom wall of said housing and permitting relatively placid water flow therebeneath from the second corner toward said first corner and drain which is relatively undisturbed by the flow of water and air above said wall means as caused by drum rotation.

9. An eddy current device comprising, in combination, a housing having an axis and an inner wall and a bottom wall, an eddy current drum coaxially in said housing and having an outer surface, an annular water box including said outer drum surface together with said housing inner wall and bottom wall, means directing water on the outer drum surface, the water on said drum outer surface being thrown off by centrifugal force to flow circumferentially around said housing inner wall in said water box, said housing inner wall and bottom wall defining first and second lower corners in said annular water box, a water drain from said first corner, deflector means fixedly carried relative to said bottom wall and extending upwardly toward said drum outer surface, said deflector means having apertures therein to permit decelerated water flow therethrough in the direction of drum rotation as caused by the drum rotation and circumferential air flow, wall means in said water box spaced from said bottom wall of said housing, said wall means having a longitudinal length approximately the same as said drum and having a transverse width less than the width of said housing bottom wall to permit water to flow downwardly at each side and underneath said wall means, and said wall means permitting relatively placid water flow therebeneath from the second corner toward said first corner and drain which is relatively undisturbed by the flow of water and air above said wall means as caused by drum rotation.

10. An eddy current device comprising, in combination, a housing having an axis and an inner wall and a bottom wall, an eddy current drum coaxially in said housing and having an outer surface, first and second annular water seal means at each axial end of said drum, an annular water box defined by said first and second water seal means and said outer drum surface together with said housing inner wall and bottom wall, means directing water on the outer drum surface, the water on said drum outer surface extracting heat therefrom and then being thrown off by centrifugal force to flow circumferentially around said housing inner wall in said water box, said housing inner wall and bottom wall defining first and second lower corners in said annular water box, a water drain from said first corner, said drum being rotatable in either direction, deflector scoop means in said water box mounted spaced from said bottom wall of said housing in each said corner, said deflector scoop means having a longitudinal length approximately the same as said drum and extending upwardly toward said drum outer surface, said deflector scoop means having apertures therein to permit circumferential air flow and decelerated water flow therethrough in the direction of drum rotation as caused by the drum rotation, said deflector scoop means permitting water flow thereunderneath from the second corner toward said first corner and drain which may be in the opposite direction from the flow of water and air adjacent said drum outer surface.

11. An eddy current device comprising, in combination, a housing having an axis and an inner wall and a bottom wall, an eddy current drum coaxially in said housing and having an outer surface, an annular water box including said outer drum surface together with said housing inner wall and bottom wall, means directing water on the outer drum surface, said housing inner wall and bottom wall defining first and second lower corners in said annular water box, a water drain from said first corner, a false bottom in said water box comprising a substantially impervious plate mounted spaced from said bottom wall of said housing, said false bottom having a longitudinal length approximately the same as said drum and having a transverse width less than the width of said housing bottom wall to permit water to flow downwardly at each side and underneath said false bottom, said false bottom permitting relatively placid water flow underneath said false bottom from the second corner toward said first corner and drain which is relatively undisturbed by the flow of water and air above said false bottom as caused by drum rotation.

12. An eddy current device comprising, in combination, a housing having an axis and an inner wall and a bottom wall, an eddy current drum coaxially in said housing and having an outer surface, first and second annular water seal means at each axial end of said drum, an annular water box defined by said first and second water seal means and said outer drum surface together with said housing inner wall and bottom wall, means directing water on the outer drum surface, the water on said drum outer surface extracting heat therefrom and then being thrown off by centrifugal force to flow circumferentially around said housing inner wall in said water box, said housing inner wall and bottom wall defining first and second lower corners in said annular water box, a water drain from said first corner, a false bottom in said water box comprising a substantially impervious plate mounted spaced from said bottom wall of said housing, said false bottom having a longitudinal length approximately the same as said drum and having a transverse width less than the width of said housing bottom wall to permit water to flow downwardly at each side and underneath said false bottom, deflector means carried on said false bottom and extending upwardly toward said drum outer surface, said deflector means having apertures therein to permit decelerated water flow therethrough in the direction of drum rotation as caused by the drum rotation and circumferential air flow, and said false bottom permitting relatively placid water flow underneath said false bottom from the second corner toward said first corner and drain which is relatively undisturbed by the flow of water and air above said false bottom as caused by drum rotation.

13. An eddy current device comprising, in combination, a housing having an axis and an inner wall and a bottom wall, an eddy current drum coaxially in said housing and having an outer surface, first and second annular labyrinth means at each axial end of said drum, an annular water box defined by said first and second labyrinth means and said outer drum surface together with said housing inner wall and bottom wall, water spray nozzle means directing water on the outer drum surface, the water sprayed on said drum outer surface extracting heat therefrom and then being thrown off by centrifugal force to flow circumferentially around said housing inner wall in said water box, passive means to redirect said water radially inwardly onto said drum outer surface to extract still more heat from said drum, said housing inner wall and bottom wall defining first and second enlarged lower corners in said annular water box, a water drain from said first corner, said drum being rotatable in either direction, a false bottom comprising an impervious plate mounted spaced from said bottom wall of said housing to be substantially parallel thereto and disposed in said water box, said false bottom having a longitudinal length approximately the same as said drum and having a transverse width less than the width of said housing bottom wall to permit water to flow downwardly below said false bottom at each side thereof, deflector means carried on said false bottom and extending upwardly toward said drum outer surface, said deflector means having apertures therein to permit decelerated water flow therethrough in the direction of drum rotation as caused by the drum rotation and circumferential air flow, said false bottom permitting relatively placid water flow underneath said false bottom from the second corner toward said first corner and drain which is relatively undisturbed by the flow of water and air above said false bottom as caused by drum rotation.

14. An eddy current device comprising, in combination, a housing having an axis and an inner wall and a bottom wall, an eddy current drum coaxially in said housing and having an outer surface, first and second annular labyrinth means at each axial end of said drum, an annular water box defined by said first and second labyrinth means together with said outer drum surface and said housing inner wall, water spray nozzle means directing water on the outer drum surface, the water sprayed on said drum outer surface extracting heat therefrom and then being thrown off by centrifugal force to flow circumferentially around said housing inner wall in said water box, said housing inner wall and bottom wall defining first and second enlarged lower corners in said annular water box, a water drain in said first corner, said drum being rotatable in either direction, a false bottom comprising a substantially flat plate mounted spaced from said bottom wall of said housing to be substantially parallel thereto and disposed in said water box, said false bottom having a longitudinal length approximately the same as said drum and having a transverse width less than the width of said housing bottom wall to permit water to flow downwardly below said false bottom at each side thereof, deflector means carried on said false bottom and extending upwardly toward said drum outer surface, said deflector means having apertures therein to permit decelerated water flow therethrough in the direction of drum rotation as caused by the drum rotation and circumferential air flow, said false bottom permitting relatively placid water flow underneath said false bottom from the second corner toward said first corner and drain which is relatively undisturbed by the flow of water and air above said false bottom as caused by drum rotation.

15. An eddy current device comprising, in combination, a rigid housing having an axis and an inner wall and a bottom wall, an eddy current drum coaxially in said housing, a rotary member having teeth cooperating through an air gap with an inner surface of said drum, an outer cylindrical surface on said drum, first and second annular walls in said housing longitudinally spaced, first and second annular labyrinth means at each axial end of said drum and cooperating with said first and second annular walls, respectively, an annular water box defined by said first and second annular walls and said first and second labyrinth means together with said outer drum surface and said housing inner wall, water spray nozzle means directing water on the outer drum surface, the water sprayed on said drum outer surface extracting heat therefrom and then being thrown off by centrifugal force to flow circumferentially around said housing inner wall in said water box, said housing inner wall being generally rectangular at the lower portion so that said annular water box has first and second enlarged lower corners, a water drain in said first corner, said drum being rotatable in either direction, a false bottom comprising a substantially flat plate mounted spaced from said bottom wall of said housing to be substantially parallel thereto and disposed in said water box, said false bottom having a longitudinal length approximately the same as said drum and having a transverse width about 80% of the width of said housing bottom wall, first and second deflector scoops carried on said false bottom and extending upwardly toward said drum outer surface, said scoops being positioned symmetrically one on each side of said false bottom, said deflector scoops having slots therein to permit water flow therethrough and to decelerate the water flowing therethrough in the direction of drum rotation as caused by the drum rotation and circumferential air flow, said false bottom permitting relatively placid water flow underneath said false bottom from the second corner toward said first corner and drain which is relatively undisturbed by the flow of water and air above said false bottom which may be in the opposite direction as caused by drum rotation.

16. An eddy current device comprising, in combination, a rigid housing having an axis and an inner wall and a bottom wall,
an eddy current drum coaxially in said housing,
a rotary member having teeth cooperating through an air gap with an inner surface of said drum,
a smoother outer cylindrical surface on said drum,
first and second annular walls in said housing longitudinally spaced,
first and second annular labyrinth means at each axial end of said drum and cooperating with said first and second annular walls, respectively,
an annular water box defined by said first and second annular walls and said first and second labyrinth means together wtih said outer drum surface and said housing inner wall,
a plurality of water spray nozzles extending through said housing into the upper portion of said water box and directing water on the outer drum surface,
a plurality of baffles mounted generally radially inwardly on the upper portion of said housing inner wall,
said baffles extending longitudinally and having longitudinal teeth with gaps therebetween and the teeth in adjacent baffles being staggered so that the teeth in one baffle are in the same cross-sectional plane as the gap between the teeth of the adjacent baffles,
the water sprayed on said drum outer surface extracting heat therefrom and then being thrown off by centrifugal force to flow circumferentially around said housing inner wall,
said baffles and especially the teeth thereof interrupting said circumferential water flow and constituting passive means to redirect said water radially inwardly onto said outer surface to extract still more heat from said drum,
said housing inner wall being generally rectangular at the lower portion so that said annular water box has first and second enlarged lower corners,
a water drain in said first corner,
said drum being rotatable in either direction,
a false bottom comprising a substantially flat plate mounted on pedestals from said bottom wall of said housing to be substantially parallel thereto and disposed in said water box,
said false bottom having a longitudinal length approximately the same as said drum and having a transverse width about 80% of the width of said housing bottom wall,
first and second deflector scoops carried on said false bottom and extending upwardly toward said drum outer drum surface,
said scoops being positioned symmetrically one on each side of the longitudinal center line at a position about 30 degrees from the vertical axial plane,
said deflector scoops having slots therein near the bottom thereof,
the gap between the teeth of the baffles and said slotted scoops permitting air flow circumferentially around said drum,
said slotted deflector scoops decelerating the water flowing therethrough in the direction of drum rotation as caused by the drum rotation and circumferential air flow,
said false bottom permitting relatively placid water flow underneath said false bottom from the second corner toward said first corner and drain which is relatively undisturbed by the flow of water and air above said false bottom which may be in the opposite direction as caused by drum rotation.

References Cited

UNITED STATES PATENTS

| | | | |
|---|---|---|---|
| 3,050,647 | 8/1962 | Winther | 310—105 |
| 3,150,276 | 9/1964 | Moyer | 310—105 |

ROBERT K. SCHAEFER, *Primary Examiner.*

H. O. JONES, *Assistant Examiner.*